(12) United States Patent
Calais et al.

(10) Patent No.: US 10,766,401 B1
(45) Date of Patent: Sep. 8, 2020

(54) AUTOMOBILE LIGHT DEVICE WITH TELEMETRY COMPONENT

(71) Applicant: Valeo North America, Inc., Troy, MI (US)

(72) Inventors: Valere Calais, Orsay (FR); Brant Potter, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 16/557,468

(22) Filed: Aug. 30, 2019

(51) Int. Cl.
| | | |
|---|---|---|
| *B60Q 1/04* | (2006.01) | |
| *F21S 41/25* | (2018.01) | |
| *F21S 41/20* | (2018.01) | |
| *G01S 17/88* | (2006.01) | |
| *F21S 41/30* | (2018.01) | |

(52) U.S. Cl.
CPC ............... *B60Q 1/04* (2013.01); *F21S 41/25* (2018.01); *F21S 41/28* (2018.01); *F21S 41/285* (2018.01); *G01S 17/88* (2013.01); *F21S 41/30* (2018.01)

(58) Field of Classification Search
CPC . B60Q 1/04; F21S 41/26; F21S 41/285; F21S 41/28; G01S 17/88
USPC ........................................................ 362/460
See application file for complete search history.

(56) References Cited

U.S. PATENT DOCUMENTS

| | | | | |
|---|---|---|---|---|
| 2,814,861 | A | * 12/1957 | O'Connell | ............... H02G 7/06 29/423 |
| 3,602,640 | A | 8/1971 | Leblanc | |
| 4,620,267 | A | 10/1986 | Cibie | |
| 5,227,910 | A | 7/1993 | Khattak | |
| 7,350,945 | B2 | * 4/2008 | Albou | ............... G01S 17/931 362/507 |
| 10,488,522 | B2 | * 11/2019 | Puente | ............... G01S 17/931 |
| 2002/0149761 | A1 | 10/2002 | Saccomanno | |
| 2012/0113410 | A1 | 5/2012 | Iwasawa et al. | |
| 2016/0146415 | A1 | * 5/2016 | Suzuki | ............... F21S 41/192 362/553 |

* cited by examiner

*Primary Examiner* — Ali Alavi
(74) *Attorney, Agent, or Firm* — Valeo North America, Inc.

(57) ABSTRACT

In one embodiment, a lighting device for a vehicle includes a first light source configured to generate first light, and a second light source configured to generate second light. A fiber optic light panel is optically coupled to the first and second light sources and includes a plurality of optical fibers each configured to emit light along a respective length of the optical fiber. The plurality of optical fibers are arranged to define an illumination region such that the first and second light is output from the illumination region.

20 Claims, 9 Drawing Sheets

AUTOMOBILE LIGHT DEVICE WITH TELEMETRY COMPONENT

FIELD OF THE INVENTION

This invention relates to automobile light systems, and more particularly to an automobile light device which incorporates a telemetry component.

BACKGROUND OF THE INVENTION

As is well known, vehicles contain numerous types of lighting devices. For example, exterior vehicle lighting devices that perform a stop light function, tail lamp function, head lamp function, daytime running light function, dynamic bending light function, and a fog light function are common.

In an effort to reduce traffic accidents, most governments provide safety regulations that specify vehicle lighting performance requirements. For example, Federal Motor Vehicle Safety Standards (FMVSS) No. 108 specifies the minimum photometric intensity for vehicle stop lamps (i.e. brake lights) on vehicles operated within the U.S. Vehicle manufacturers must design vehicle lighting devices to meet the technical requirements of these or similar standards around the world. In recent years, vehicle lighting has also become important for its aesthetic appeal to consumers. Thus, vehicle manufacturers have made an effort to design vehicle lighting devices in consideration of the styling of the vehicle on which the lighting devices are mounted. Further, vehicle manufacturers may provide optional lighting effects (in addition to the required lighting functionality) to enhance vehicle styling and/or provide auxiliary lighting functions for the vehicle.

Vehicle light devices have become complex systems that incorporate other light devices to provide one or more lighting and/or signaling functions. For example, vehicle head lamps require multiple components, such as light sources, reflectors, lenses, cut off devices and the like.

SUMMARY OF THE INVENTION

It is one object of the present disclosure is to describe example light devices which incorporate a telemetry component.

This and/or other objects may be provided by aspects of the invention disclosed herein, including the following.

Aspect 1 relates to a light device for a vehicle, including: an enclosure; a vehicle light source configured to provide vehicle light within said enclosure; an optical element coupled to said enclosure and provided along a first optical path of said vehicle light, said optical element being configured to optically affect said vehicle light to facilitate at least one of a lighting and signaling function for the vehicle; and a telemetry component provided within said enclosure and optically associated with telemetry light that provides a telemetry function for the vehicle, said telemetry light having a second optical path that extends to said optical element such that the optical element is configured to optically couple said vehicle light and said telemetry light.

Aspect 2 relates to the light device of Aspect 1, wherein the telemetry component includes at least one of a laser configured to provide said telemetry light, and a detector configured to detect reflected telemetry light returned from a roadway.

Aspect 3 relates to the light device of aspect 2, wherein the telemetry component includes a laser provided within said enclosure, said laser configured to provide pulsed telemetry light.

Aspect 4 relates to the light device of Aspect 2, wherein the telemetry component includes a detector provided within said enclosure.

Aspect 5 relates to the light device of Aspect 4, wherein the detector includes multiple detector elements arranged in a matrix configuration.

Aspect 6 relates to the light device of Aspect 5, wherein the detector is integrated into a reflector of the light device.

Aspect 7 relates to the light device of Aspect 1, wherein said enclosure including a headlamp housing forming a cavity and having an opening; and said optical element includes a cover lens coupled to said housing to cover said opening, the optical element being configured to optically couple said vehicle light and said telemetry light.

Aspect 8 relates to the light device of Aspect 1, wherein: said enclosure including a light module casing forming a cavity and having an opening; and said optical element includes a projecting lens coupled to said casing to cover said opening, the optical element being configured to optically couple said vehicle light and said telemetry light.

Aspect 9 relates to the light device of Aspect 1, wherein said optical element includes at least one of a lens and a reflector.

Aspect 10 relates to the light device of Aspect 9, wherein said lens includes a clear portion configured to transmit said vehicle light and said telemetry light without optical affecting the vehicle light or said telemetry light.

Aspect 11 relates to the light device of Aspect 9, wherein said lens includes an optical portion configured to transmit said vehicle light and said telemetry light and to provide an optical effect to the vehicle light and said telemetry light.

Aspect 12 relates to the light device of Aspect 11, wherein said optical effect is includes at least one of scattering, diffraction and diffusion.

Aspect 13 relates to the light device of Aspect 9, wherein said optical element includes a reflector.

Aspect 14 relates to the light device of Aspect 13, wherein said reflector includes a free form reflector.

Aspect 15 relates to the light device of Aspect 9, wherein said optical element includes a lens and a reflector, each of the lens and reflector being configured to optically couple said vehicle light and said telemetry light.

Aspect 16 relates a vehicle lighting system including: a light device of aspect 1; and a related light device including another enclosure; another vehicle light source configured to provide vehicle light within said another enclosure; another optical element coupled to said another enclosure and provided along a first optical path of said vehicle light, said another optical element being configured to optically affect said vehicle light to facilitate at least one of a lighting and signaling function for the vehicle; and another telemetry component provided within said another enclosure and optically associated with telemetry light that provides a telemetry function for the vehicle, said telemetry light having a second optical path that extends to said another optical element such that the another optical element is configured to optically couple said vehicle light and said telemetry light.

Aspect 17 relates to the vehicle lighting system of Aspect 16, wherein said telemetry component of the light device includes an emitter for said telemetry light; and said another telemetry component of the related light device includes a detector for telemetry light reflected from an object.

Aspect 18 relates to the vehicle lighting system of Aspect 16, wherein: said telemetry component of the light device includes a first emitter configured to emit said telemetry light along a first optical axis; and said another telemetry component of the related light device includes a second emitter configured to emit said telemetry light along a second optical axis different from said first optical axis.

Aspect 19 relates to the vehicle lighting system of Aspect 1, wherein said telemetry component includes an emitter configured to emit said telemetry light along a plurality of different optical axes.

Aspect 20 relates to a light device for a vehicle, including: a headlamp housing forming a cavity and having an opening; a cover lens coupled to said housing to cover said opening and provided along a path of vehicle light that provides at least one of a lighting and signaling function for the vehicle; a telemetry component provided within said enclosure and optically associated with telemetry light having a light path within the enclosure, said telemetry light providing a telemetry function for the vehicle, wherein said optical element is configured to optically couple said vehicle light and said telemetry light.

DETAILED DESCRIPTION OF SEVERAL EMBODIMENTS

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in the specification, but rather is defined by the claims.

In the interest of clarity, not all of the features of the implementations described herein are shown and described in detail. It will be appreciated that in the development of any such actual implementation, numerous implementation-specific decisions will be made in order to achieve the developer's specific goals, such as compliance with application and business-related constraints, and that these specific goals will vary from one implementation to another.

Figure 1:
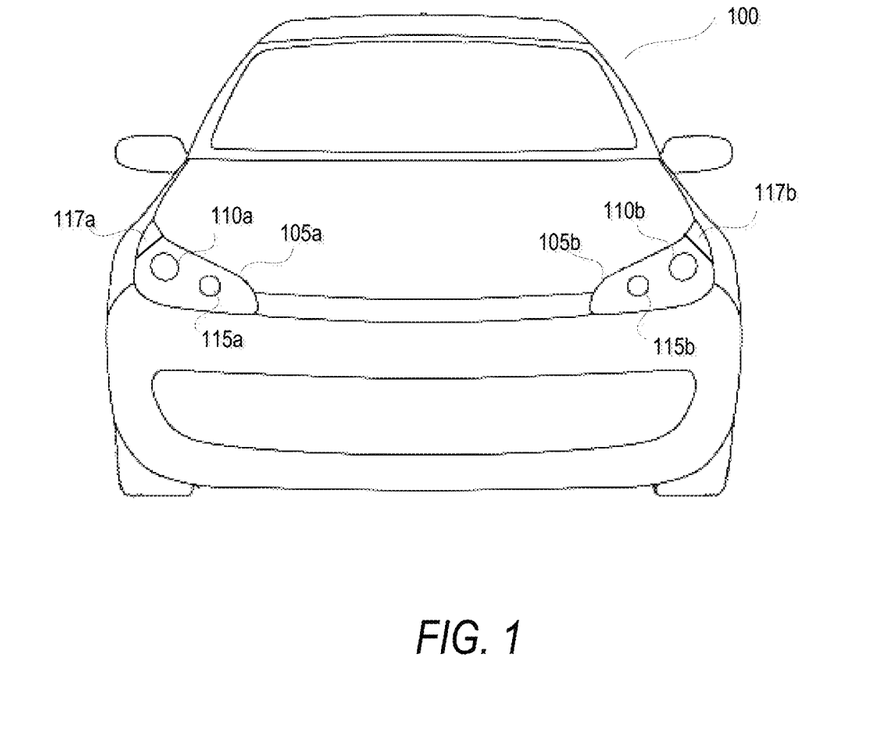
FIG. 1 illustrates an automotive vehicle which may include a light device incorporating a telemetry component in accordance with embodiments of the disclosure.

Referring now to the drawings, wherein like reference numerals designate identical or corresponding parts throughout several views, the following description relates to a vehicle light device and methodology for facilitating a telemetry function of a vehicle. FIG. 1 illustrates an automotive vehicle which may include a light device incorporating a telemetry component in accordance with embodiments of the disclosure.

The vehicle 100 may be any type of vehicle such as a car, truck, bus, helicopter, or motorcycle. The vehicle 100 may be gas-powered, diesel powered, electric, or solar-powered. The vehicle 100 may be actively operated by a driver or may be partially or completely autonomous or self-driving.

Motor vehicle 100 includes light devices implemented as headlamp assemblies 105a, 105b for providing a lighting and/or signaling functions for the vehicle. Lighting functions generally relate to projecting light ahead of the vehicle so that the driver can better anticipate the roadway ahead (bends, road signs, pedestrians, trees etc.). For example, low beam and high beam are common lighting functions for a vehicle headlamp, while reverse lamp is a common lighting function for tail lamps. Signaling functions generally allow light to be seen by other drivers and pedestrians. For example, parking light, front direction indicator, daytime running lamps and front position lamp are common signaling functions for the front of the vehicle, while stop lamp, rear position lamp, rear fog lamp, and rear direction indicator are common signaling functions for the rear of the vehicle.

Headlamp assemblies 105a and 105b include low beam headlamps 110a, 110b (also referred to as a lower or dipped beam), high beam headlamps 115a, 115b (also referred to as a main or driving beam), and turn indicator devices 117a, 117b. Typically, the low beam headlamps 110a, 110b are used whenever another vehicle is on the road directly ahead of motor vehicle 100 and/or whenever another vehicle is approaching motor vehicle 100 from an opposite direction. High beam headlamps 115a, 115b are typically used to see long distances when other vehicles are not within view. Turn indicators 117a, 117b signal to other drivers and pedestrians a direction that the vehicle will turn. Other lamp devices may also be included in the headlamp 105a and/or 105b.

Figure 2A:
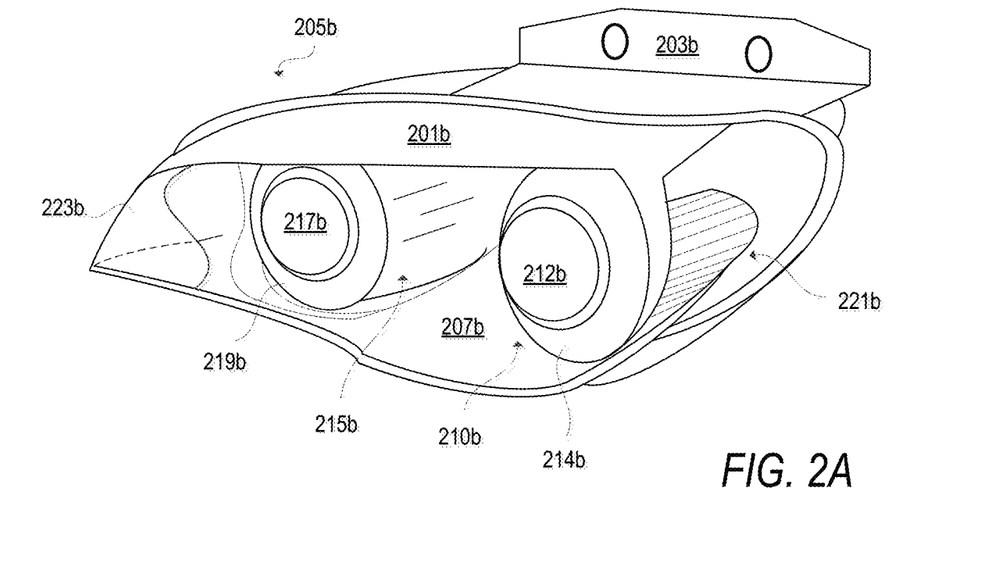
FIG. 2A illustrates an example headlamp assembly which may incorporate a telemetry component in accordance with embodiments of the disclosure.

FIG. 2A illustrates an example headlamp assembly which may incorporate a telemetry component in accordance with embodiments of the disclosure. As seen, the headlamp assembly 205b includes a housing 201b having a mounting structure 203b for mounting the headlamp assembly to a higher level assembly such as a chassis of vehicle 100. The housing 201b provides a carrier of all headlamp components (cable, reflector, etc.), and permits fixing of the headlamp 205b to the vehicle body. Further, the housing provides protection against exterior influences such as humidity, heat, etc. Typically, the housing is formed from thermoplastics, but any suitable material may be used. Housing 201b is shaped to provide a cavity 207b in which light modules 210b and 215b, and turning indicator 221b are provided. As seen, light module 210b includes a lens 212b (sometimes referred to as an "inner lens"), and a trim or bezel piece 214b. Similarly, light module 215b includes a lens 217b (sometimes referred to as an "inner lens"), and a trim or bezel piece 219b. The low beam headlamps 110a, 110b and high beam headlamps 115a, 115b are schematically shown as projection modules within the headlamp, while turn indicator devices 117a, 117b are schematically shown as reflector devices. However, the light devices within the headlamp assembly may be implemented as reflective devices or projection devices.

Cover lens 223b generally enclose the housing and protects the components of the headlamp 205b from weather conditions. Cover lens 223b may include dispersion optics for deflecting, scattering or focusing light to produce the desired light distribution to meet a particular lighting function. Cover lens 223 may be clear and have no optical elements therein.

Figure 2B:
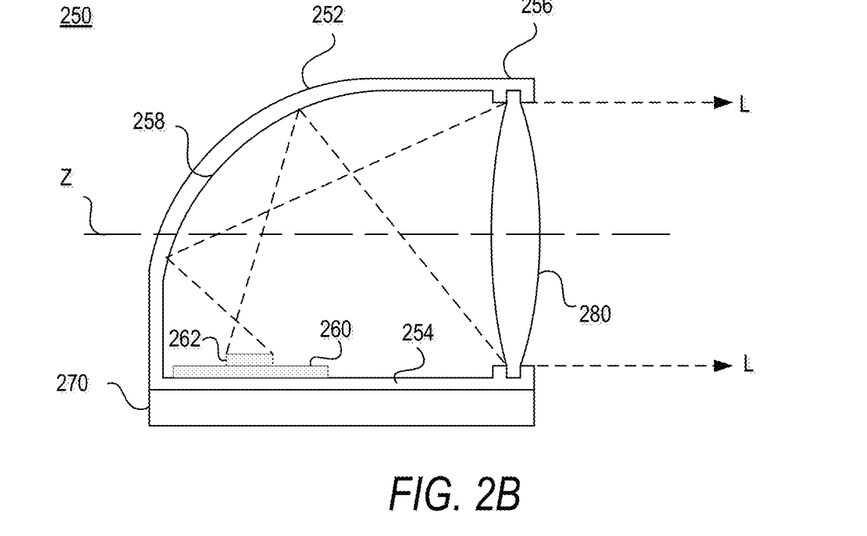
FIG. 2B illustrates an example light module which may incorporate a telemetry component in accordance with embodiments of the disclosure.

FIG. 2B illustrates an example light module which may incorporate a telemetry component in accordance with embodiments of the disclosure. Light module 250 may be used to implement the modules 210b and 215b of FIG. 2A, for example. As seen, the light module 250 includes housing 252 having a mounting portion 254, a reflecting portion 256, and a coupling portion 258. Circuit board 260 is mounted to the mounting portion 254 and includes a light source 262 provided thereon. Thermal management device 270, such as a heat sink may be provided to dissipate heat from the circuit board 260 and light source 262. Further coupling portion 258 of the housing is configured to receive a lens 280. As seen, light emitted from the light source 262 is reflected by the reflector portion 256 towards the lens 280, which optically affects the light and projects the light out of the housing in a desired pattern L.

Figure 3:
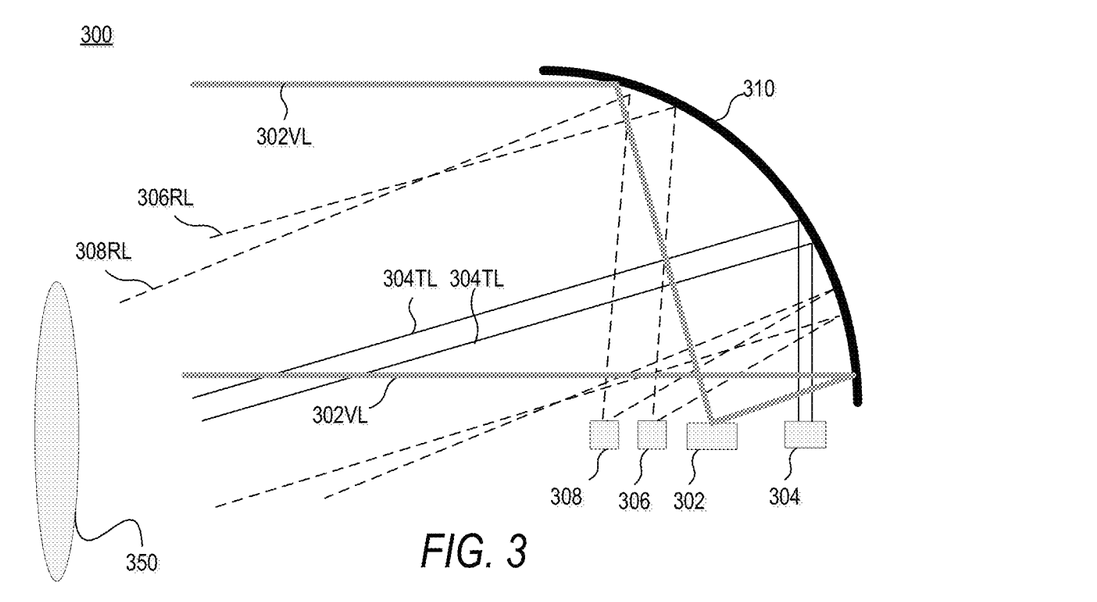
FIG. 3 is a schematic representation of light device having a telemetry light source and a telemetry detector incorporated in the light device in accordance with an example embodiment of the disclosure.
Figure 4:
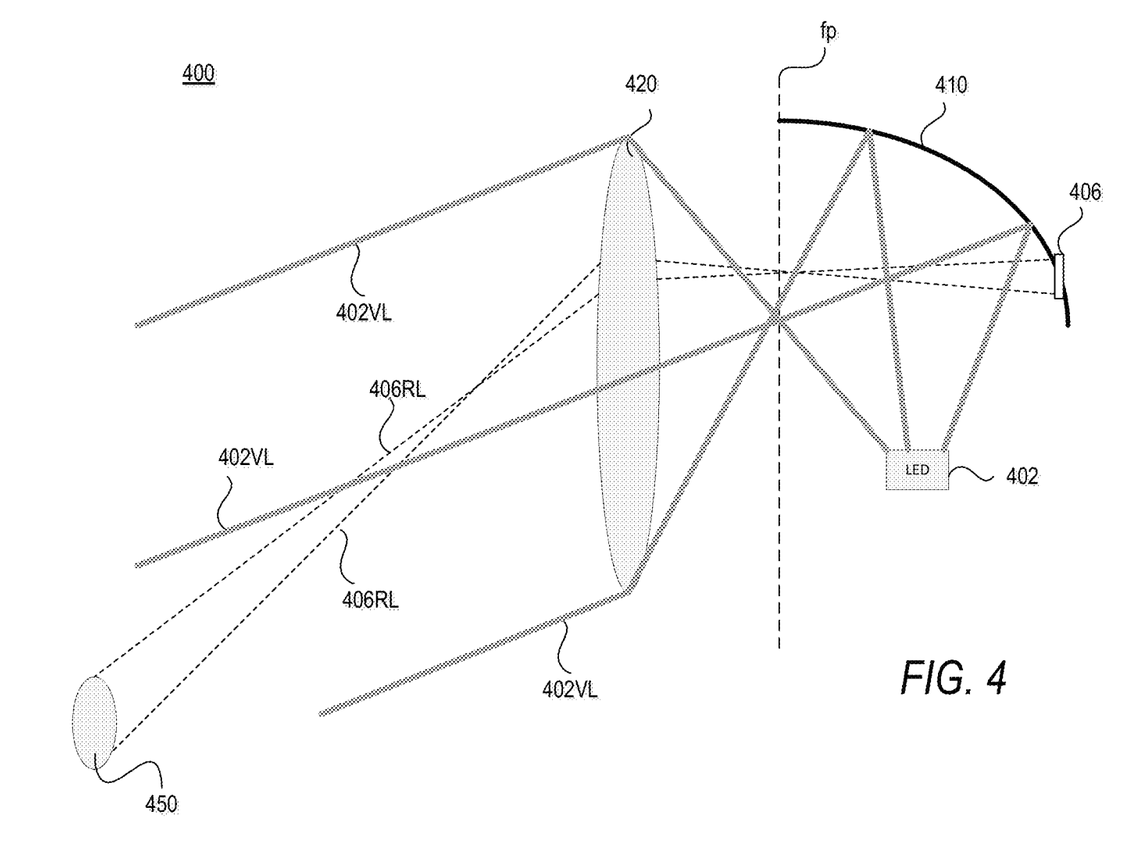
FIG. 4 is a schematic representation of light device having a telemetry detector integrated within a reflector of the light device in accordance with an example embodiment of the disclosure.

FIG. 3 is a schematic representation of light device having a telemetry light source and a telemetry detector incorporated in the light device in accordance with an example embodiment of the disclosure. As seen, the device 300 includes vehicle light source 302, telemetry laser source 304, first photosensor 306, second photosensor 308, and reflector 310. Vehicle light source 302 emits vehicle light 302VL. Telemetry light source 304 emits telemetry light 304TL, which may be returned as returned light 306RL and 308RL FIG. 4 is a schematic representation of light device having a telemetry detector integrated within a reflector of the light device in accordance with an example embodiment of the disclosure. As seen, the light module 400 includes vehicle light source 402, first photosensor device 406, and reflector 410. Thus, a telemetry laser source is not provided within the module, but rather at an external location such as the bumper or within the other headlamp. Vehicle light source 402 provides vehicle light 402VL and telemetry light provided from an external telemetry light source, is returned from the roadway as returned light 406RL. Reflector 410 is along the optical path of both the vehicle light and the telemetry light. Similarly, lens 420 is along the optical path of both the vehicle light and the telemetry light.

Figure 5:
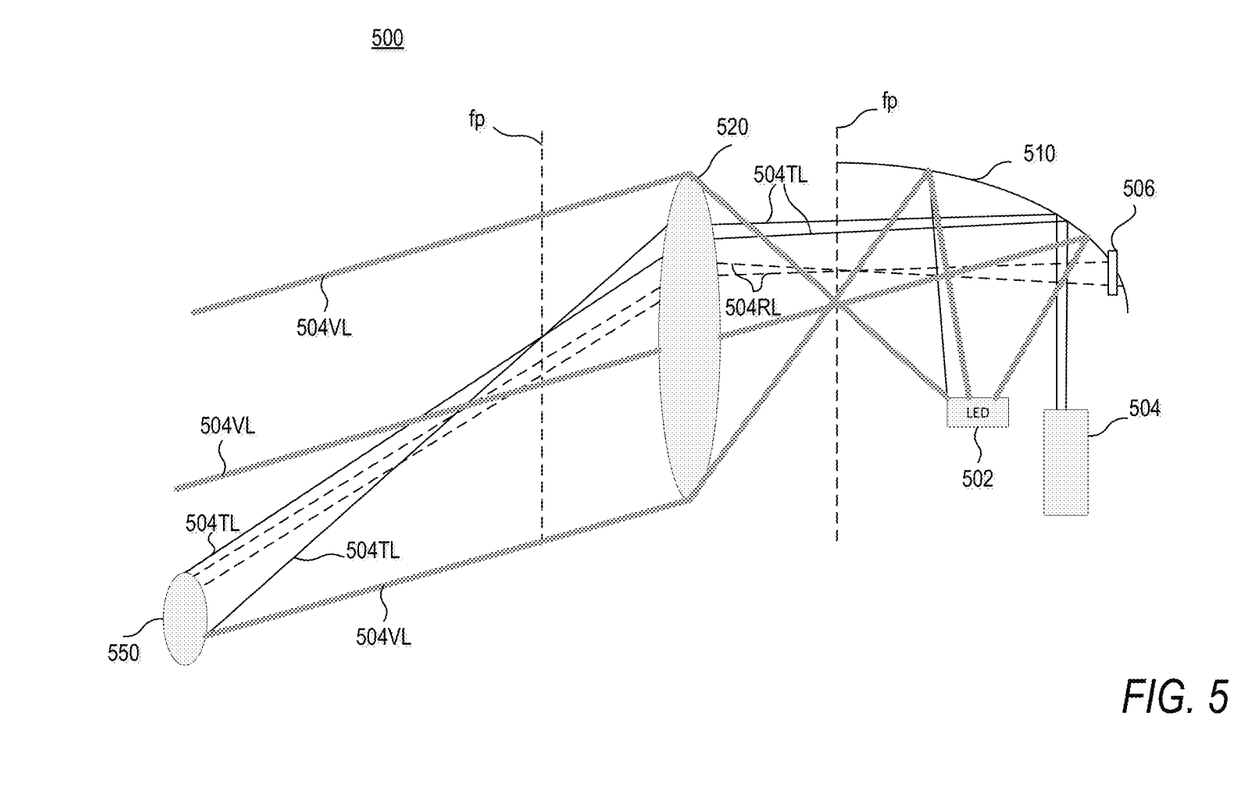
FIG. 5 is a schematic representation of light device having a telemetry light source provided within the device and a telemetry detector integrated within a reflector of the light device in accordance with an example embodiment of the disclosure.

FIG. 5 is a schematic representation of light device having a telemetry light source and a telemetry detector integrated within a reflector of the light device in accordance with an example embodiment of the disclosure. As seen, the light device 500 includes vehicle light source 502, telemetry laser source 504, photosensor 506, reflector 510 and lens 520. Vehicle light source 502 emits vehicle light 502VL. Telemetry light source 504 emits telemetry light 504TL, which may be returned as returned light 504RL. Reflector 510 is along the optical path of both the vehicle light and the telemetry light. Similarly, lens 520 is along the optical path of both the vehicle light and the telemetry light.

In some embodiments, a vehicle headlamp may include multiple modules, with one or more modules having at least one telemetry emitter or laser, and one or more other modules having at least one detector. For example, a headlamp such as that of FIG. 2A may include three light modules: a high-beam module, a low-beam kink module, and a low-beam flat module, where the low-beam kink module and a low-beam flat module include components for a telemetry function. Such embodiments may save space, and may increase the signal strength and/or resolution of telemetry by use of multiple telemetry signals.

Figure 6A:
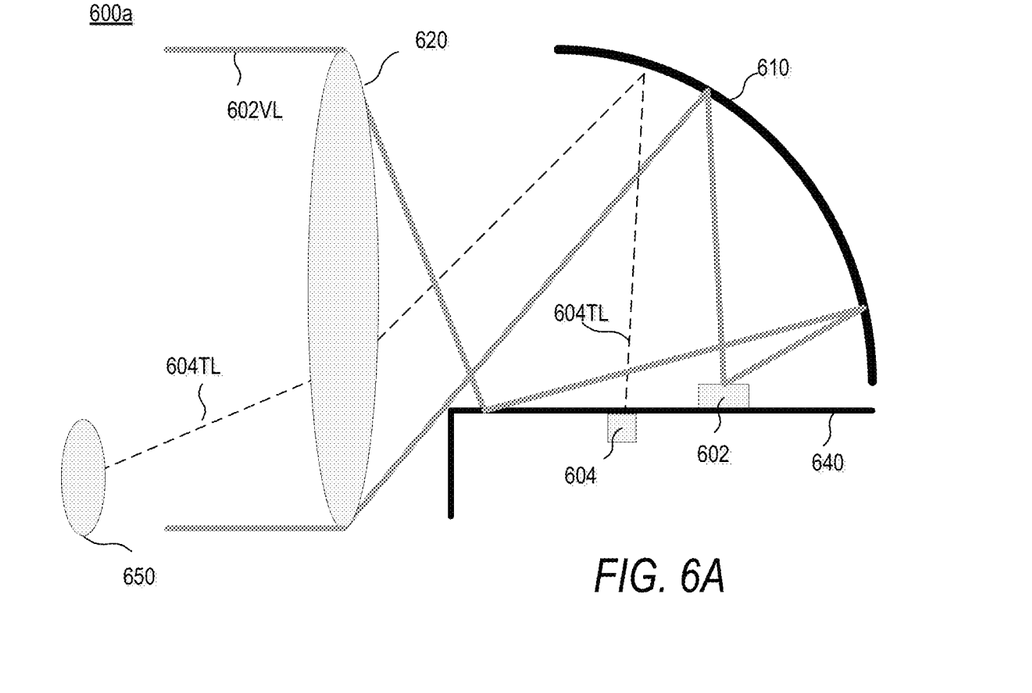
FIG. 6A is a schematic representation of light device having a telemetry light source provided within the device.
Figure 6B:
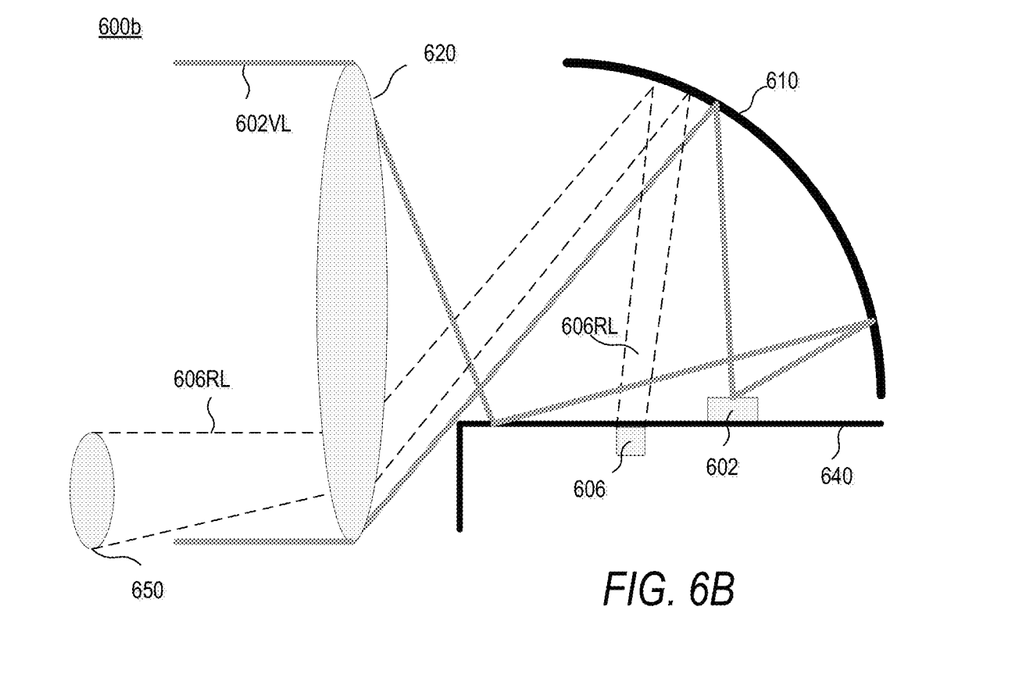
FIG. 6B is a schematic representation of related light device having a telemetry detector provided within the device in accordance with example embodiments of the disclosure.

FIG. 6A is a schematic representation of light device having a telemetry light source provided within the device, and FIG. 6B is a schematic representation of related light device having a telemetry detector provided within the related device in accordance with example embodiments of the disclosure. The device 600a of FIG. 6A may be a kink module, and the device 600b of FIG. 6B may be a flat module. As seen, the kink module 600a includes vehicle light source 602, telemetry source 604, reflector 610, folder 640 and lens 620. Vehicle light source 602 emits vehicle light 602VL and telemetry light source 604 emits telemetry light 604TL that is incident on object 650. Each of the reflector 610 and lens 620 is along the optical path of both the vehicle light and the telemetry light. Flat module 600b in FIG. 6B has a similar device configuration except that the telemetry source 604 is replaced with photosensor device 606. As seen, telemetry light from the source 604 is returned from object 650 as returned light 606RL.

Figure 7A:
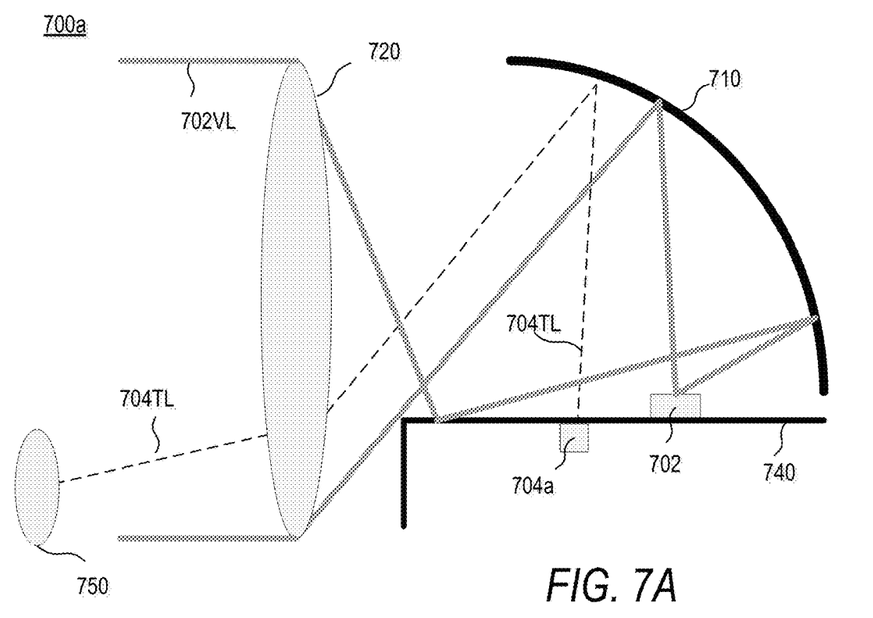
FIG. 7A is a schematic representation of light device having a telemetry light source provided within the device.
Figure 7B:
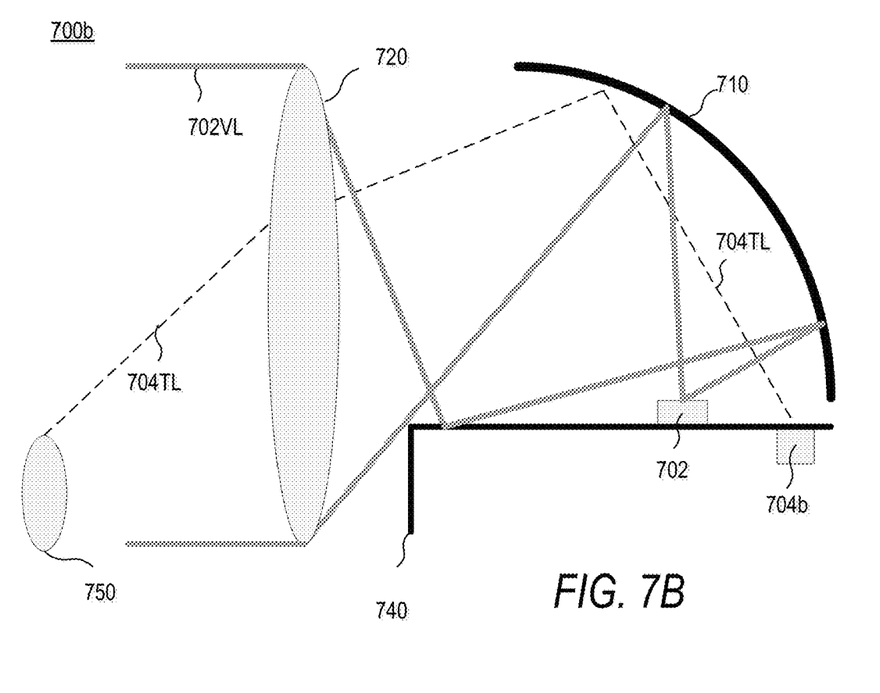
FIG. 7B is a schematic representation of related light device having a telemetry detector provided at a different position within the device in accordance with example embodiments of the disclosure.

Multiple modules may also be used to provide independent telemetry beams having optical axes at different angles. FIG. 7A is a schematic representation of light device having a telemetry light source provided within the device, and FIG. 7B is a schematic representation of related light device having a telemetry detector provided at a different position within a different device in accordance with example embodiments of the disclosure. The device 700a of FIG. 7A may be a kink module, and the device 700b of FIG. 7B may be a flat module. As seen, the kink module 700a includes vehicle light source 702, telemetry source 704a, reflector 710, folder 740 and lens 720. Vehicle light source 702 emits vehicle light 702VL and telemetry light source 704a emits telemetry light 704TL along a first optical axis. Flat module 700b in FIG. 7B has a similar device configuration except that the telemetry source 704a is replaced with telemetry source 704b provided at a different position so as to emit telemetry light along a second optical axis different from the first optical axis. That is, the laser or emitter of the kink module and flat modules are provided at different locations within their respective housings to a different angle of telemetry beam. This use of two beams at different angles can aid in calculation of vehicle attitude and leveling.

Figure 8A:
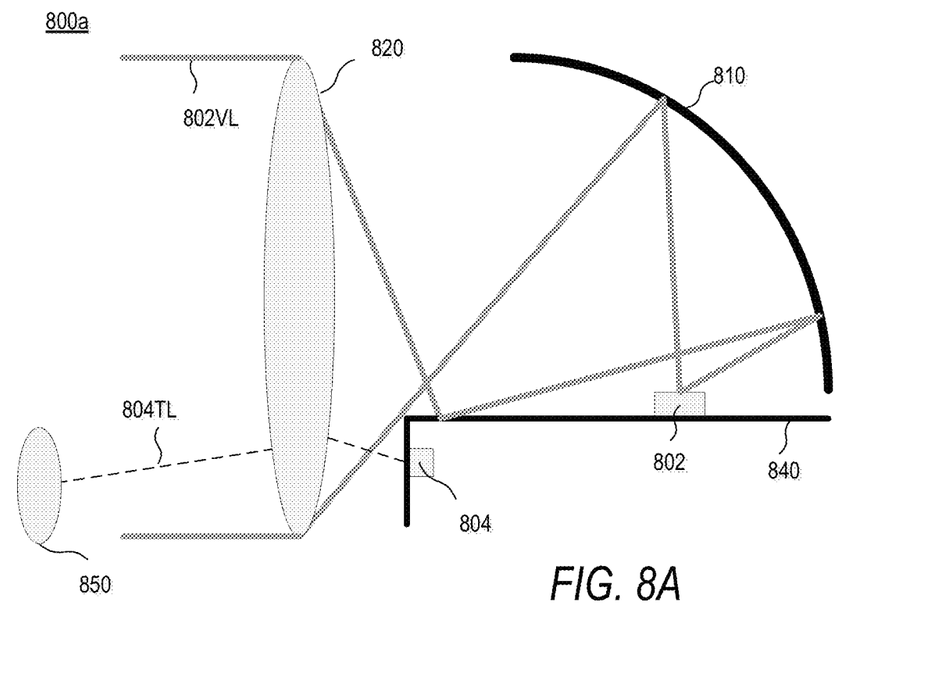
FIG. 8A is a schematic representation of light device having a telemetry light source provided within the device.
Figure 8B:
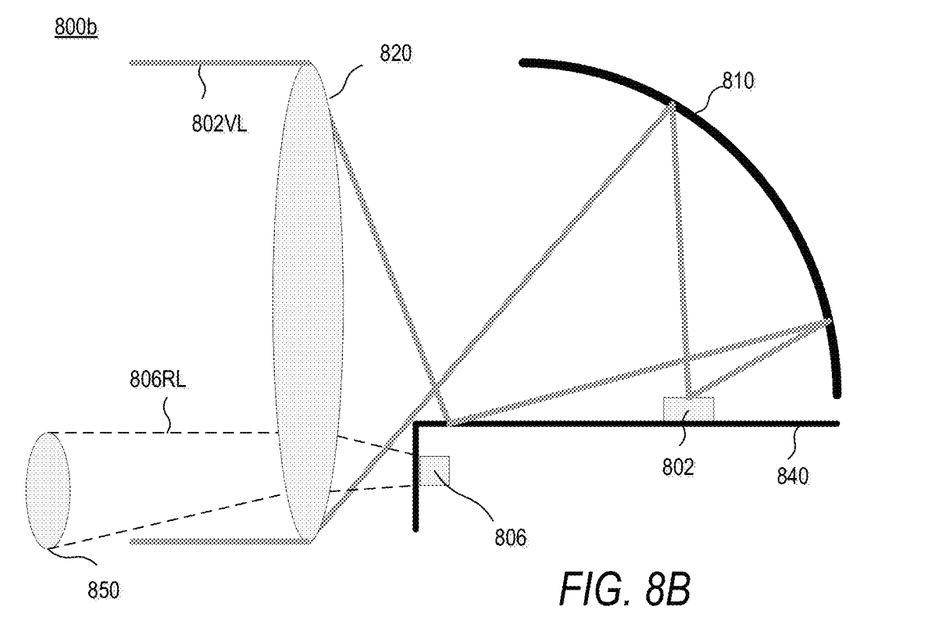
FIG. 8B is a schematic representation of related light device having a telemetry detector provided within the device in accordance with example embodiments of the disclosure.

In some embodiments, the emitter or detector for telemetry may be located in a vertical surface of the folder. FIG. 8A is a schematic representation of light device having a telemetry light source provided within the vertical surface of its folder, and FIG. 8B is a schematic representation of related light device having a telemetry detector provided within the vertical surface of a folder in accordance with example embodiments of the disclosure. Specifically, The device 800a of FIG. 8A may be a kink module, and the device 800b of FIG. 8B may be a flat module. As seen, the kink module 800a includes telemetry source 804a in the vertical wall of folder 840, and flat module 800b includes telemetry detector 806 in the vertical wall of folder 840. This permits flexibility in the layout of the light devices. However, location of the telemetry components in the vertical surface of the folder presents a risk of sunburn.

Figure 9:
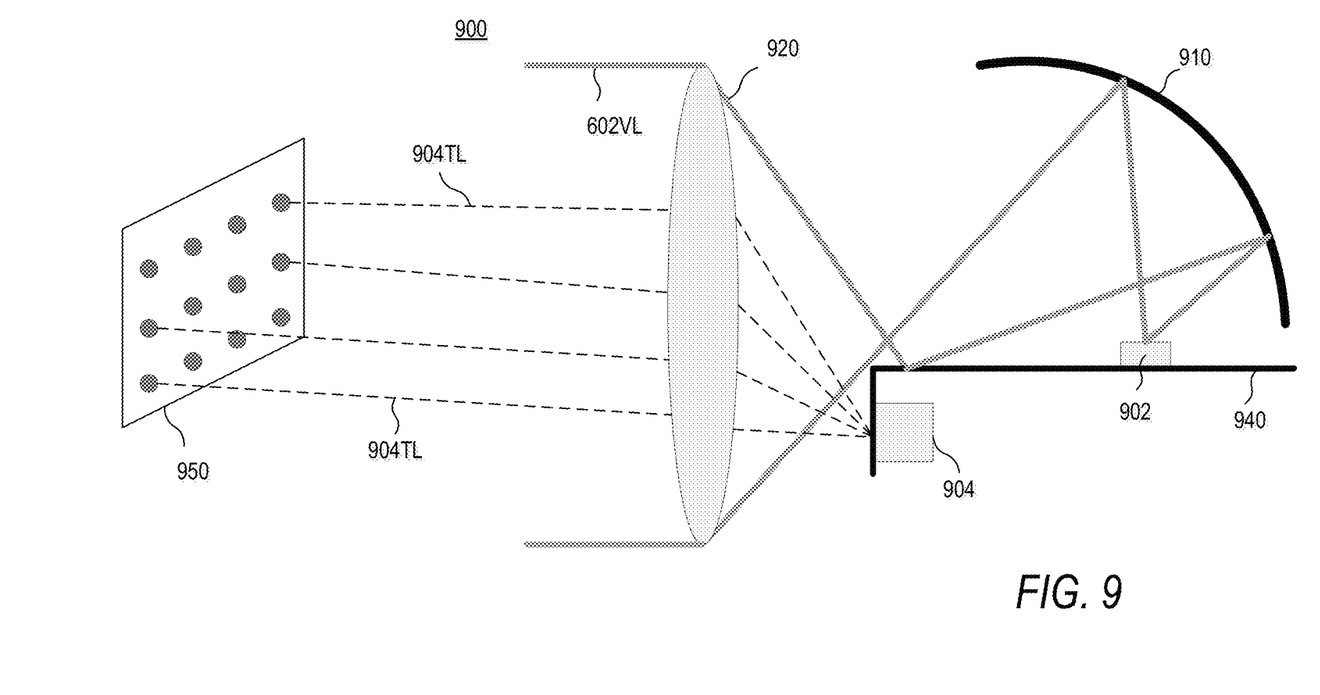
FIG. 9 is a schematic representation of light device having a scanning telemetry light source provided within the device in accordance with an example embodiment of the disclosure.

In still other embodiments, the telemetry source can be incident on multiple points within a scene. FIG. 9 is a schematic representation of light device having a scanning telemetry light source provided within the device in accordance with an example embodiment of the disclosure. As seen, the device 900 includes vehicle light source 902, telemetry source 904, reflector 910, folder 940 and lens 920. Telemetry light source 904 emits telemetry light 904TL along multiple paths, which can be returned from the scene 950. More specifically, the use of an infrared (IR) emitter and HOE or IR scanning Laser can create a known pattern of points in the scene 950. A camera system can interpret the grid of points on the scene to for object detection and topography mapping. In this regard, infrared (IR) light may be used as the telemetry emitter or source in any of the embodiments discussed herein.

Figure 10:
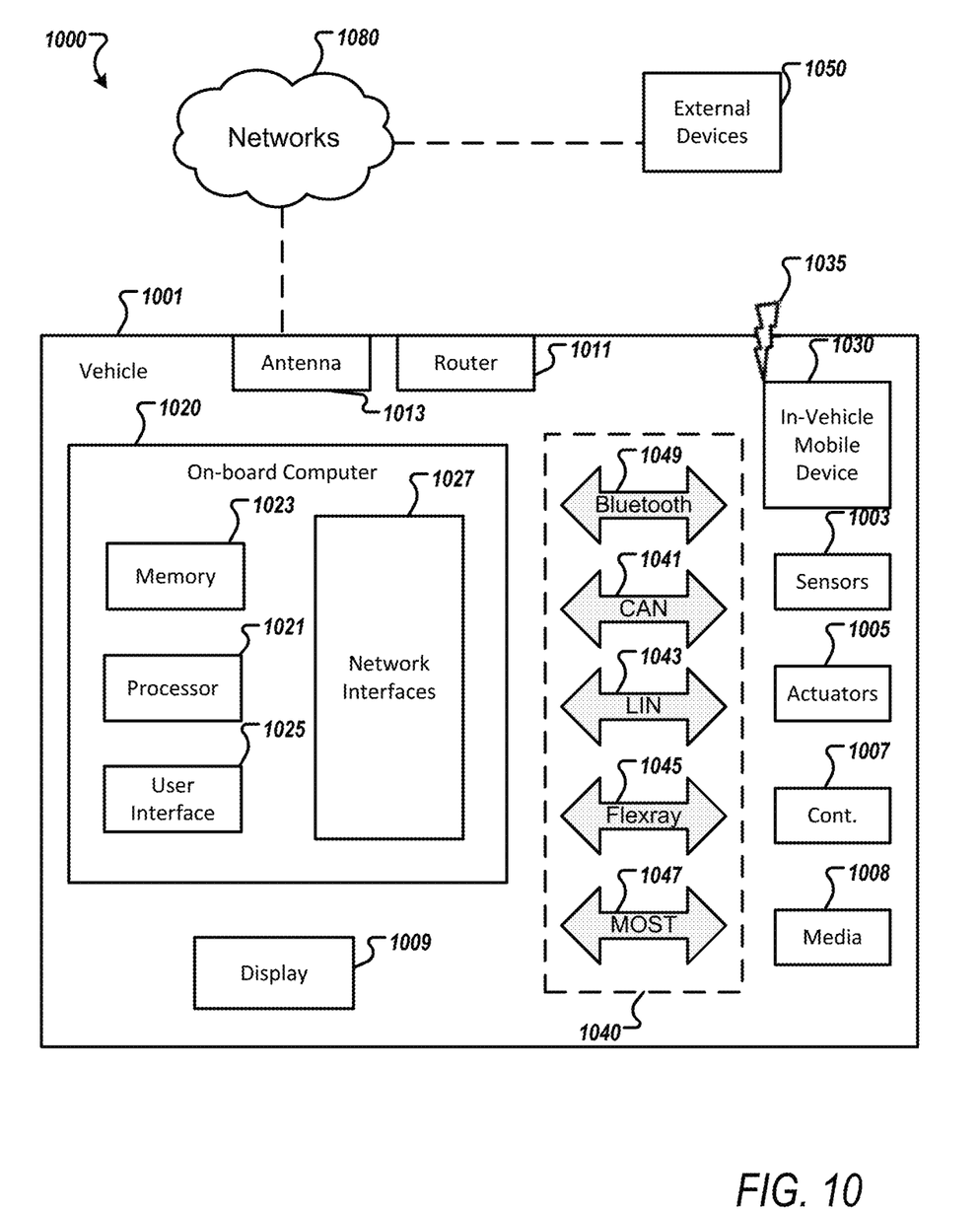
FIG. 10 is a simplified block diagram of a vehicle environment in which embodiments of the invention disclosed herein may be implemented.

FIG. 10 is a simplified block diagram of a vehicle environment in which embodiments of the invention disclosed herein may be implemented. The vehicle environment 1000 includes a vehicle 1001 in communication with one or more external devices 1050 by way of one or more external networks 1080. Vehicle 1001 also includes various internal networks 1040 for interconnecting several vehicle devices within the vehicle as will be discussed below. The vehicle environment 1000 may also include one or more in-vehicle mobile device 1030. External devices 1050 include any device located outside the vehicle 1001 such that the external device must communicate with the vehicle and its devices by an external network 1080. For example, the external devices may include mobile devices, electronic devices in networked systems (e.g., servers or clients in a local area network (LAN), etc.), on board computers of other vehicles etc. In-vehicle mobile devices 1030 are devices which are located within, or in the vicinity of the vehicle 1001 such that the in-vehicle mobile device can communicate directly with internal networks 1040 of the vehicle 1001. In-vehicle mobile devices 1030 may also connect with external networks 1080 as discussed below.

Vehicle 1001 includes vehicle devices integral with or otherwise associated with the vehicle 1001. In the embodiment of FIG. 10, vehicle devices include one or more sensors 1003, one or more actuators 1005, one or more control units 1007, one or more media systems 1008, one or more displays 1009, one or more routers 1011, one or more antenna 1013, and one or more on board computers 1020. As used herein, the term "vehicle device" is meant to encompass sensors, actuators, controllers, electronic control units (ECUs), detectors, instruments, embedded devices, media devices including speakers, a CD and/or DVD player, a radio, etc, vehicle navigation systems (e.g., GPS) displays, other peripheral or auxiliary devices or components associated with the vehicle 1001.

Sensors 1003 detect various conditions within (or in the immediate vicinity of) the vehicle 1001. For example, sensors 1003 may be temperature sensors, photosensors, position sensors, speed sensors, angle sensors or any other sensor for detecting a diagnostic condition or other parameter of the vehicle 1001 or its ambient environment. Sensors 1003 may be passive or "dumb" sensors that provide an analog representative of the sensed parameter, or so called "smart" sensors with integrated memory and digital processing capability to analyze the parameter sensed within the sensor itself. Actuators 1005 cause motion of some mechanical element of the vehicle in response to a control signal. For example, actuators 1005 may be hydraulic actuators, pneumatic actuators or electrical/electronic actuators such as a stepper motor. Actuators 1005 may be used to move vehicle lighting devices to implement intelligent light, for example.

Actuators 1005 may also be "dumb" devices that react to a simple analog voltage input, or "smart" devices with built-in memory and processing capability. Actuators 1005 may be activated based on a sensed parameter from sensors 1003, and one such sensed parameter may be a physical position of the actuator 1003 itself. Thus, the sensors 1003 and actuators 1005 may be connected in a feedback control loop for diagnostic detection and control of the vehicle 1001.

Control units 1007 include any embedded system, processor, electronic control unit (ECU) or microcontroller. Control unit 1007 may be dedicated to a specific region or function of the vehicle 1001. For example, control unit 1007 can provide memory and control logic functions for several dumb devices, such as passive sensors 1003 and actuators 1005. In one embodiment, control unit 1007 is an ECU dedicated for controlling one or more lighting devices according to embodiments disclosed herein. Typically, numerous ECUs, with different embedded software, may be found in a single automobile and may communicate via internal networks as discussed below.

On-board computer 1020 is a vehicle device for providing general purpose computing functionality within the vehicle 1001. The on-board computer 1020 typically handles computationally intensive functions based on software applications or "apps" loaded into memory. On-board computer 1020 may also provide a common interface for different communication networks in the vehicle environment 1000. On-board computer 1020 includes one or more processor 1021, one or more memory 1023, one or more user interface 1025, and one or more network interface 1027. One or more display 1009 and one or more router 1011 may be an integral part of the on board computer 1010, or distributed in the vehicle and associated with the on-board computer and other vehicle devices. Separate displays 1009 may be provided in suitable locations for access by a driver and passengers in the vehicle 1001.

On-board computer 1020, and other associated or integrated components such as vehicle devices can include one or more memory element 106 for storing information to be used in achieving operations associated with control of fiber optic light panels as disclosed herein. Further, these devices may keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in vehicle environment 1000 could be provided in any database, register, table, cache, queue, control list, or storage structure, based on particular needs and implementations, all of which could be referenced in any suitable timeframe.

In example embodiments, the operations for controlling fiber optic light devices may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar vehicle device, etc.). In some of these instances, one or more memory elements (e.g., memory 1023) can store data used for the operations described herein. This includes the memory elements being able to store software, logic, code, or processor instructions that are executed to carry out the activities described in this Specification.

Processor 1021 can execute software or algorithms to perform activities to enable control of lighting devices disclosed herein. A processor 1021 can execute any type of instructions associated with the data to achieve the operations detailed herein. In one example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of computer-readable mediums suitable for storing electronic instructions. Any of the potential processing elements, modules, microprocessors, digital signal processors (DSPs), and other devices described herein should be construed as being encompassed within the broad term 'processor.'

Elements of FIG. 10 may be communicatively coupled to one another by one or more suitable communications medium (wired, wireless, optical) that provides a pathway for electronic communications. Any element in FIG. 10 may act as a network node in communication with any other element of FIG. 10 also acting as a network node. Any suitable network messaging protocol, network topology or network geographic scope may be included in the vehicle environment 1000. Thus, embodiments of on-board computer 10 may include one or more distinct interfaces, represented by network interfaces 1027, to facilitate communication via the various networks (including both internal and external networks) described herein. Such network interfaces 1027 may be inclusive of multiple wireless interfaces (e.g., WiFi, WiMax, 3G, 4G, white space, 802.11x, satellite, Bluetooth, LTE, GSM/HSPA, CDMA/EVDO, DSRC, CAN, GPS, etc.). Other interfaces represented by network interfaces 26, may include physical ports (e.g., Ethernet, USB, HDMI, etc.), interfaces for wired and wireless internal subsystems, and the like. Similarly, each of the nodes of vehicle environment 1000 can also include suitable interfaces for receiving, transmitting, and/or otherwise communicating data or information in the vehicle environment 1000.

Multiple internal vehicle networks represented by 1040 may exist in the vehicle 1001 to provide communication pathways to various vehicle devices distributed throughout the vehicle 1001. An internal vehicle network 1040 is a collection of nodes, such as vehicle devices, integrated with or otherwise linked to the vehicle and interconnected by communication means. Vehicle networks 1040 typically include hard wired bus type networks, each providing communication pathways to particular vehicle devices distributed throughout a vehicle. FIG. 10 shows four examples of such hard wired networks: Controller Area Network (CAN) 1041, Local Internet Network (LIN) 1043, Flexray bus 1045, and Media Oriented System Transport (MOST) network 1047.

CAN bus 1041 uses a message based protocol, designed for and typically used by automotive applications. The CAN bus 1041 is a vehicle bus standard designed to allow microcontrollers, sensors, and other devices to communicate with each other via the CAN without a host computer. CAN protocol may be used for soft real-time control of devices such as a vehicle antilock braking system. For example, CAN bus 1041 may connect a transmission sensor and an energy sensor to a main engine controller, and a different CAN bus may connect the main engine controller and a main body controller to on-board computer 1020. LIN network 1043, may be used to sense external conditions such as light, or to control small mechanisms such as door locking systems. For example, LIN bus 1043 may connect a driver's seat actuator, temperature controls, and windshield wiper actuators to a main body controller of a CAN bus.

Flexray bus 1045 is typically a dedicated network for hard real-time controllers, used for drive-by-wire and/or brake-by-wire applications in which information from the engine and/or wheels of the vehicle 1001 is collected and transmitted to appropriate applications and/or data repositories. For example, Flexray bus 1045 may connect a chassis module of the vehicle 1001 to on-board computer 1020 through an appropriate interface, and/or may connect brakes and electronic stability control (ESB) to the chassis module attached to Flexray 1045. MOST network 1047 can also be found in vehicles for transmitting audio, video, and voice on fiber optics. MOST buses 1047 can connect media system 1008, to on-board computer 1020 through appropriate interfaces, and/or connect a reversing camera and a navigation system to an intermediate device which is connected to computer by MOST bus 1047.

Other hard wired internal networks such as Ethernet may be used to interconnect vehicle devices in the vehicle. Further, internal wireless networks 1049, such as near field communications, Bluetooth etc may interconnect vehicle devices.

External networks 108 may be accessed from vehicle 1001 by vehicle devices and in-vehicle mobile devices 1030 when a communication link is available. In-vehicle mobile devices 1030 include mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges within vehicle environment 1000. Data, may be any type of numeric, voice, video, or script data, or any type of source or object code, or any other suitable information in any appropriate format that may be communicated from one point to another in electronic devices and/or networks. A vehicle router 1011 may also be used to access external network infrastructure within range of the antenna 1013 of vehicle 1001.

Some form of wireless communication is needed to achieve external network connectivity from vehicle 1001. For example third generation (3G), fourth generation (4G), and 3GPP long term evolution (LTE) wireless telephone technologies, worldwide interoperability for microwave access (WiMax), WiFi, and dedicated short-range communications (DSRC) are some of the numerous wireless technologies currently available with the appropriate interfaces and network infrastructure to support the technology.

Users (driver or passenger) may initiate communication in vehicle environment 1000 via some network, and such communication may be initiated through any suitable device such as, in-vehicle mobile device 1030, display 1009, user interface 1025, or external devices 1050.

In-vehicle mobile devices 1030, and mobile devices external to vehicle 1001, may communicate with on-board computer 1020 through any wireless or wired communication link and may be configured as a personal area network (PAN) or a wireless personal area network (WPAN) or any other appropriate networking architecture or system that facilitates communications in a network environment. Wired and wireless communication links may any electronic link such as Bluetooth, wireless technologies (e.g., IEEE 802.11x), a USB cable, an HDMI cable, etc. In one example, an external mobile device may be connected to computer 102 through a USB cable or wireless network when, for example, the external mobile device is a diagnostic tool used by a mechanic for servicing vehicle 10.

This invention, including all embodiments shown and described herein, could be used alone or together and/or in combination with one or more of the features covered by one or more of the claims set forth herein, including but not limited to one or more of the features or steps mentioned in the Summary of the Invention and the claims.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims. In particular, one skilled in the art will understand that the invention disclosed herein can be applied to meet could be applied in accordance with Federal Motor Vehicle Safety Standards (FMVSS) No. 108, as well as corresponding regulations in Europe, Japan, China and other parts of the world.

The invention claimed is:

1. A light device for a vehicle, comprising:
   an enclosure;
   a vehicle light source configured to provide vehicle light within said enclosure;
   an optical element coupled to said enclosure and provided along a first optical path of said vehicle light, said optical element being configured to optically affect said vehicle light to facilitate at least one of a lighting and signaling function for the vehicle; and
   a telemetry component provided within said enclosure and optically associated with telemetry light that provides a telemetry function for the vehicle, said telemetry light having a second optical path that extends to said optical element such that the optical element is configured to optically couple said vehicle light and said telemetry light.

2. The light device of claim 1, wherein the telemetry component comprises at least one of a laser configured to provide said telemetry light, and a detector configured to detect reflected telemetry light returned from a roadway.

3. The light device of claim 2, wherein the telemetry component comprises a laser provided within said enclosure, said laser configured to provide pulsed telemetry light.

4. The light device of claim 2, wherein the telemetry component comprises a detector provided within said enclosure.

5. The light device of claim 4, wherein the detector comprises multiple detector elements arranged in a matrix configuration.

6. The light device of claim 5, wherein the detector is integrated into a reflector of the light device.

7. The light device of claim 1, wherein:
   said enclosure comprising a headlamp housing forming a cavity and having an opening; and
   said optical element comprises a cover lens coupled to said housing to cover said opening, the optical element being configured to optically couple said vehicle light and said telemetry light.

8. The light device of claim 1, wherein:
   said enclosure comprising a light module casing forming a cavity and having an opening; and
   said optical element comprises a projecting lens coupled to said casing to cover said opening, the optical element being configured to optically couple said vehicle light and said telemetry light.

9. The light device of claim 1, wherein said optical element comprises at least one of a lens and a reflector.

10. The light device of claim 9, wherein said lens comprises a clear portion configured to transmit said vehicle light and said telemetry light without optical affecting the vehicle light or said telemetry light.

11. The light device of claim 9, wherein said lens comprises an optical portion configured to transmit said vehicle light and said telemetry light and to provide an optical effect to the vehicle light and said telemetry light.

12. The light device of claim 11, wherein said optical effect is comprises at least one of scattering, diffraction and diffusion.

13. The light device of claim 9, wherein said optical element comprises a reflector.

14. The light device of claim 13, wherein said reflector comprises a free form reflector.

15. The light device of claim 9, wherein said optical element comprises a lens and a reflector, each of the lens and reflector being configured to optically couple said vehicle light and said telemetry light.

16. A vehicle lighting system comprising:
   a light device of claim 1; and
   a related light device comprising
      another enclosure;
      another vehicle light source configured to provide vehicle light within said another enclosure;
      another optical element coupled to said another enclosure and provided along a first optical path of said vehicle light, said another optical element being configured to optically affect said vehicle light to facilitate at least one of a lighting and signaling function for the vehicle; and
      another telemetry component provided within said another enclosure and optically associated with telemetry light that provides a telemetry function for the vehicle, said telemetry light having a second optical path that extends to said another optical element such that the another optical element is configured to optically couple said vehicle light and said telemetry light.

17. The vehicle lighting system of claim 16, wherein:
   said telemetry component of the light device comprises an emitter for said telemetry light; and said another telemetry component of the related light device comprises a detector for telemetry light reflected from an object.

18. The vehicle lighting system of claim 16, wherein:
said telemetry component of the light device comprises a first emitter configured to emit said telemetry light along a first optical axis; and
said another telemetry component of the related light device comprises a second emitter configured to emit said telemetry light along a second optical axis different from said first optical axis.

19. The vehicle lighting system of claim 1, wherein said telemetry component comprises an emitter configured to emit said telemetry light along a plurality of different optical axes.

20. A light device for a vehicle, comprising:
a headlamp housing forming a cavity and having an opening;
a cover lens coupled to said housing to cover said opening and provided along a path of vehicle light that provides at least one of a lighting and signaling function for the vehicle;
a telemetry component provided within said enclosure and optically associated with telemetry light having a light path within the enclosure, said telemetry light providing a telemetry function for the vehicle, wherein said optical element is configured to optically couple said vehicle light and said telemetry light.

* * * * *